United States Patent
Wang et al.

(10) Patent No.: US 8,218,072 B2
(45) Date of Patent: Jul. 10, 2012

(54) IMAGE PICKUP SYSTEM

(75) Inventors: Sheng-Ping Wang, Taipei (TW);
Ying-Jieh Huang, Taipei (TW);
Tung-Hsuan Pai, Taipei (TW);
Chih-Ping Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 340 days.

(21) Appl. No.: 12/753,245

(22) Filed: Apr. 2, 2010

(65) Prior Publication Data

US 2011/0149088 A1    Jun. 23, 2011

(30) Foreign Application Priority Data

Dec. 18, 2009    (TW) ................................ 98143537 A

(51) Int. Cl.
*H04N 5/225*    (2006.01)
(52) U.S. Cl. ........................................................ 348/373
(58) Field of Classification Search .................... 348/373
See application file for complete search history.

(56) References Cited

U.S. PATENT DOCUMENTS

| | | | |
|---|---|---|---|
| 7,397,511 B2 * | 7/2008 | Ezawa | 348/373 |
| 7,969,505 B2 * | 6/2011 | Saito | 348/373 |
| 2008/0117581 A1 * | 5/2008 | Kuo et al. | 361/683 |

* cited by examiner

*Primary Examiner* — James Hannett
(74) *Attorney, Agent, or Firm* — Kirton McConkie; Evan R. Witt

(57) ABSTRACT

An image pickup system includes a base, a frame, an image pickup device, a receiving structure, a marking element and a switching element. The frame is connected to the base. The image pickup device is disposed on the frame. The receiving structure is disposed in the base. The frame is rotatable with respect to the base, so that the image pickup device is moved to an optimal shooting position. The marking element indicates that the image pickup device is at the optimal shooting position. When the switching element is triggered, the target object placed in the receiving structure will be shot by the image pickup device.

17 Claims, 2 Drawing Sheets

IMAGE PICKUP SYSTEM

FIELD OF THE INVENTION

The present invention relates to an image pickup system, and more particularly to an image pickup system having a marking element for notifying the user that an image pickup device is located at an optimal shooting position.

BACKGROUND OF THE INVENTION

Image pickup devices are usually used to take photographs or holding video conferences. With increasing development of digital techniques, text documents are gradually created as electronic files. Generally, text documents are scanned by scanning apparatuses and then saved as electronic files such as PDF (Portable Document Format) files. For most companies, the scanning apparatuses are essential apparatuses. For some companies, the scanning apparatuses are not necessarily purchased. In other words, the applications of the scanning apparatuses to create electronic files are limited.

Recently, a method has been proposed for creating electronic files of simple documents (e.g. single-sided papers or business cards) without the need of using the scanning apparatus. In this method, an image pickup device is served as a peripheral device of the computer to capture the image of the document. The captured image of the document is saved as an electronic file. This electronic file is an image file such as a JPEG (Joint Photographic Experts Group) file. Most users prefer using scanning apparatuses to scan the text documents as PDF files because the texts and signs contained in the PDF files are readable by the computer and may be converted as editable text files.

As known, optical character recognition (OCR) is a process of capturing an image of a document and then extracting the texts from the image. Recently, it is possible to analyze images that are captured from the image pickup device by the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

When an image pickup device is used to capture the image of a document, some difficulties possibly occur. For example, it is critical to hold the document steady. For capturing the image of an article contained in the document by the image pickup device of the notebook computer, if this document is held by the user's hand, the document is readily rocked due to the long holding time. Under this circumstance, the obtained document image is usually blurred. For preventing from rocking of the document and thus obtaining a sharp document image, a static document stand is used for holding the document steady. The use of the document stand, however, incurs another problem. For example, in a case that the document stand is used in other places, the user should carry the document stand, which is very troublesome to the user.

Recently, an image pickup system without any document stand has been disclosed in for example Taiwanese Patent Publication No. 200825600, which is entitled "System and method for assisting fixed-focus shooting device to focus". In this image pickup system, the document to be captured is placed on a platform, and an image pickup device is disposed on a moving device for capturing the image of the document. As the image pickup device is moved to an optimal shooting position by the moving device, it is a suitable time to capture the image of the document by the image pickup device. The image pickup system also uses a program to analyze the image acquired by the image pickup device, thereby judging whether the image pickup device is at the optimal shooting position. The platform has a specified mark. According to the image change of the specified mark correlating with distances, the program may realize the distance between the platform and the image pickup device. According to settings of the program, a notifying signal is generated when the distance between the platform and the image pickup device is close to the optimal shooting distance. The notifying signal may notify the user that it is a suitable time to capture the image of the document. In other words, the conventional image pickup system only provides a relatively large shooting zone of the image pickup device, and the image pickup device is not actually located at the optimal shooting position. In this circumstance, the imaging performance is deteriorated. Moreover, for assuring whether the image pickup device is located at the optimal shooting position, the image needs to be continuously analyzed during the shooting process. That is, the conventional image pickup system wastes much computer resource to judge whether the image pickup device is located at the optimal shooting position.

SUMMARY OF THE INVENTION

The present invention provides an image pickup system for precisely positioning an image pickup device.

In accordance with an aspect of the present invention, there is provided an image pickup system. The image pickup system includes a base, a frame, an image pickup device, a receiving structure, a switching element, a marking element and a controlling unit. The frame is connected to the base, and rotatable with respect to the base. The image pickup device is disposed on the frame for shooting a target object, thereby acquiring a target object image. The receiving structure is disposed in the base for placing the target object therein. The switching element is arranged between the frame and the base. When the switching element is triggered, a shooting signal is generated and the distance between the image pickup device and the target object is equal to a shooting distance. The marking element is used for indicating that the switching element is triggered and the distance between the image pickup device and the target object a shooting distance is equal to the shooting distance. The controlling unit is connected to the image pickup device. An image recognition program is executed in the image pickup system to analyze a preview image acquired by the image pickup device, and judge whether the preview image is identical to the target object image. Once the image recognition program judges that the preview image is identical to the target object image, the controlling unit issues a stopping signal to the image pickup device. In response to the stopping signal, the image pickup device stops shooting the target object.

In an embodiment, when the shooting signal is received by the controlling unit, the image pickup device is controlled by the controlling unit to shoot the target object.

In an embodiment, after the shooting signal has been received by the controlling unit for a delaying time, the image pickup device is controlled by the controlling unit to shoot the target object.

In an embodiment, the image pickup device is a web camera, and the receiving structure is a recess.

In an embodiment, the image pickup system is a notebook computer, the frame is an upper cover, the base is a keyboard base, the image pickup device is a web camera disposed on the upper cover, and the receiving structure is a recess of the keyboard base.

In an embodiment, the receiving structure further comprises a detecting element, which is connected to the controlling unit for detecting whether the target object placed in the receiving structure is detached from the receiving structure. Once the target object is detached from the receiving structure, the detecting element issues a changing signal to the controlling unit.

In an embodiment, the detecting element is a sensor.

In an embodiment, the image recognition program analyzes a preview block image of the preview image and a target object block image of the target object image, thereby judging whether the preview image is identical to the target object image. A location of the preview block image included in the preview image corresponds to a location of the target object block image included in the target object image.

In an embodiment, the image recognition program is an optical character recognition (OCR) program.

In an embodiment, the target object is a document or a business card.

In an embodiment, the switching element is disposed on the frame. A triggering part is disposed on the base for triggering the switching element when the frame is rotated with respect to the base.

In an embodiment, the switching element is disposed on the base. A triggering part is disposed on the frame for triggering the switching element when the frame is rotated with respect to the base.

In an embodiment, the marking element is arranged on a sidewall of the frame. When the frame is rotated with respect to the base and the switching element is triggered by the triggering part, the marking element is sustained against the base such that the frame fails to be further rotated. Preferably, the marking element is a supporting rod.

In an embodiment, the marking element is a first mark arranged at a sidewall of the frame, and a second mark is arranged on a sidewall of the base. When the frame is rotated with respect to the base and the line going through the first mark and the second mark is a plumb line, the rotation of the frame is stopped and the image pickup device is allowed to shoot the target object.

In an embodiment, the marking element is arranged on a sidewall of the base. When the frame is rotated with respect to the base and the switching element is triggered by the triggering part, the marking element is sustained against the frame such that the frame fails to be further rotated. Preferably, the marking element is a supporting rod.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For precisely positioning the image pickup device to perform a shooting operation, the present invention provides an image pickup system.

Figure 1:
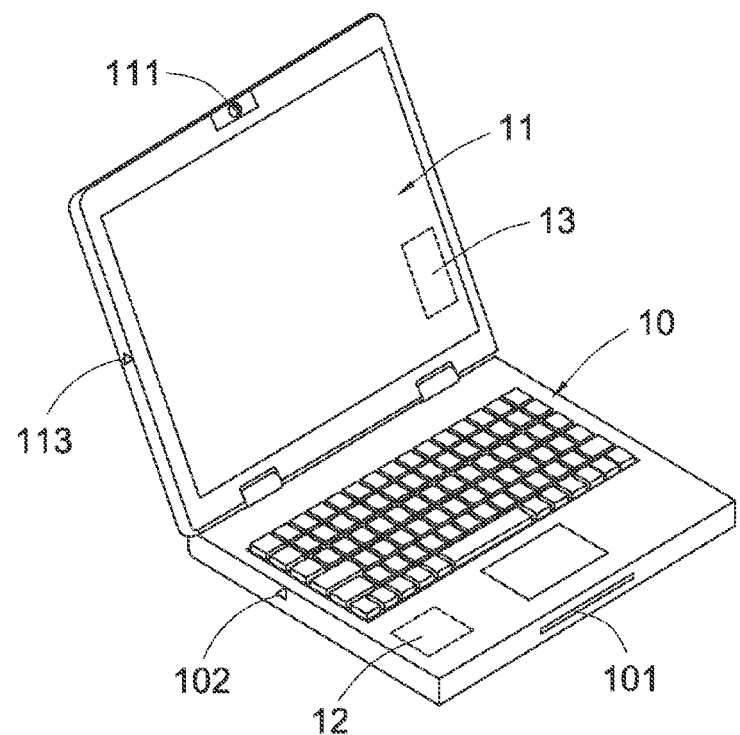
FIG. 1 is a schematic perspective view illustrating an image pickup system according to a first embodiment of the present invention.
Figure 2:
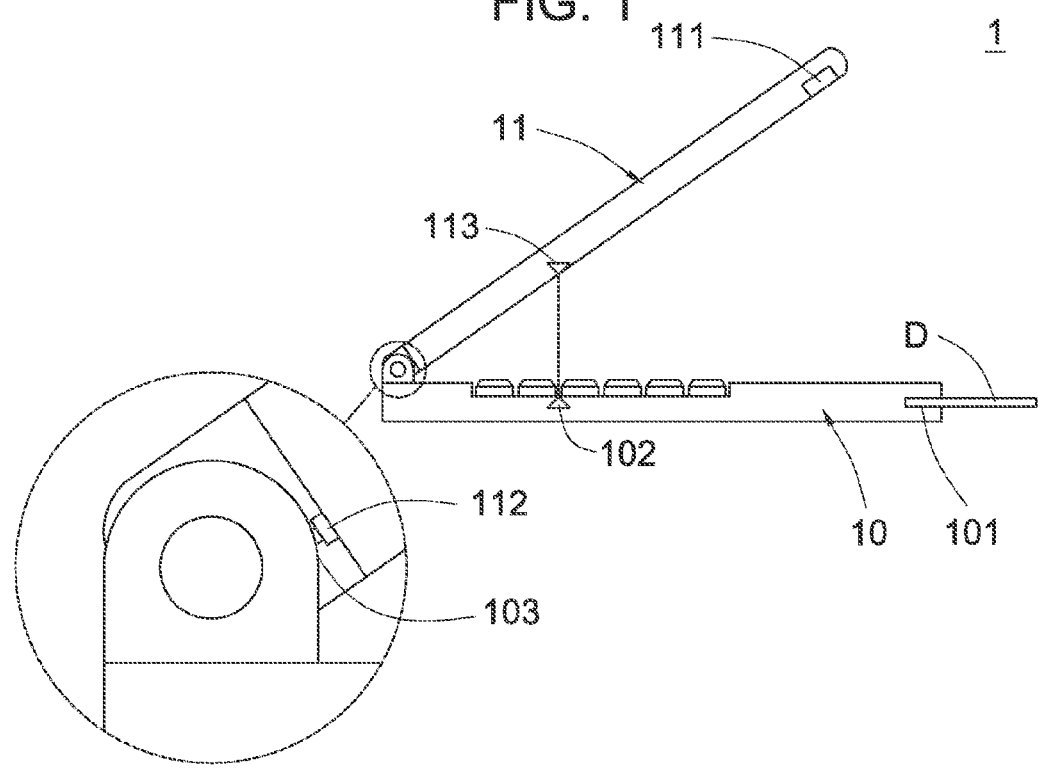
FIG. 2 is a schematic side view illustrating the image pickup system of FIG. 1.

FIG. 1 is a schematic perspective view illustrating an image pickup system according to a first embodiment of the present invention. FIG. 2 is a schematic side view illustrating the image pickup system of FIG. 1. As shown in FIGS. 1 and 2, the image pickup system 1 comprises a base 10, a frame 11, a controlling unit 12 and an image recognition program 13. The base 10 comprises a receiving structure 101, a second mark 102 and a triggering part 103. The receiving structure 101 is formed in the base 10 for placing a target object D therein. The frame 11 is connected to the base 10. The frame 11 is rotatable with respect to the base 10. The frame 11 comprises an image pickup device 111, a switching element 112 and a first mark 113. The image pickup device 111 is disposed on the frame 11 for shooting the target object D, thereby acquiring a target object image. As the frame 11 is rotated, the image pickup device 111 could approach the receiving structure 101. The image recognition program 13 is executed to analyze a preview image that is acquired by the image pickup device 111.

In an embodiment, the image pickup system 1 is a notebook computer, the base 10 is a keyboard base, and the frame 11 is an upper cover. The image pickup device 111 is a web camera that is disposed on the upper cover 11. The receiving structure 101 is for example a recess of the keyboard base 10. The target object D is a document of any size or a business card.

In accordance with the image pickup system 1 of the present invention, the image pickup device 111 is movable toward the target object D by rotating the upper cover 11 in order to shoot the target object D. For precisely adjusting the image pickup device 111 to an optimal shooting position, a mechanism is required to notify the user and the image pickup system 1. For example, this mechanism should have the functions of notifying the user that the image pickup device 111 is located at the optimal shooting position, and notifying the image pickup system 1 that it is a suitable time to shoot the target object D. This mechanism of the image pickup system 1 comprises the switching element 112 and the first mark 113 of the upper cover 11 and the second mark 102 and the triggering part 103 of the keyboard base 10. The first mark 113 is arranged on a sidewall of the upper cover 11. The switching element 112 is disposed on the upper cover 11. The second mark 102 is arranged on a sidewall of the keyboard base 10. The triggering part 103 is disposed on the keyboard base 10. As the upper cover 11 is rotated with respect to the keyboard base 10, the switching element 112 is triggered by the triggering part 103.

After the image pickup system 1 is activated and ready to perform the shooting operation, the user may rotate the upper cover 11. During the process of rotating the upper cover 11 with respect to the keyboard base 10, the user may realize whether the rotation of the upper cover 11 needs to be stopped by examining the relative locations of the first mark 113 and the second mark 102. For example, once the line going through the first mark 113 and the second mark 102 is a plumb line, it is meant that the image pickup device 111 is located at the optimal shooting position. As such, the rotation of the upper cover 11 needs to be stopped. At the moment when the line going through the first mark 113 and the second mark 102 is a plumb line, the switching element 112 of the upper cover 11 is moved to a position where the switching element 112 is triggered by the triggering part 103. In this situation, the switching element 112 is triggered to generate a shooting signal to the controlling unit 12. According to the shooting signal, the controlling unit 12 controls the image pickup device 111 to shoot the target object D. For precisely positioning the image pickup device 111, the relative locations and relative angle of the first mark 113 and the second mark 102 should be elaborately computed and unduly experimented. Similarly, the triggering part 103 and the switching element 112 should also be elaborately arranged. According to the elaborate arrangement, the switching element 112 is just triggered when the image pickup device 111 is located at the optimal shooting position.

In addition to the positioning function, the image pickup system 1 further comprises the image recognition program 13 to provide the function of recognizing the target object D. An example of the image recognition program 13 is an optical character recognition (OCR) program. Hereinafter, a process of successively shooting ten business cards by the image pickup device 111 will be illustrated in more details. Firstly, the user may firstly insert the first business card into the recess 101 of the keyboard base 10 in order to fix the first business card. Next, the above-mentioned positioning procedures are performed to adjust the image pickup device 111 to the optimal shooting position. The first business card is shot by the image pickup device 111, thereby acquiring a first business card image. After the first business card image is stored, the shooting operation on the first business card is completed. Next, the first business card is removed from the recess 101, and the second business card is inserted into the recess 101. In accordance with a key feature of the image pickup system 1, a preview image is generated by the image pickup device 111 before the shooting operation is performed. By analyzing the preview image and comparing the preview image with the stored first business card image, the image recognition program 13 can judge whether the preview image is identical to the first business card image. Once the image recognition program 13 judges that the preview image is different from the first business card image, the image pickup system 1 is continuously operated. Whereas, if the business card having been shot is repeatedly inserted into the recess 101 because of carelessness, the image recognition program 13 will judge whether the preview image is identical to the image of a corresponding business card. As a consequence, the control unit 12 will issue a stopping signal to the image pickup device 111. In response to the stopping signal, the image pickup device 111 stops shooting the current business card.

In an embodiment, the image recognition program may judge whether the preview image is identical to the target object image by analyzing a preview block image of the preview image and a target object block image of the target object image. The location of the preview block image included in the preview image corresponds to a location of the target object block image included in the target object image.

Figure 3:
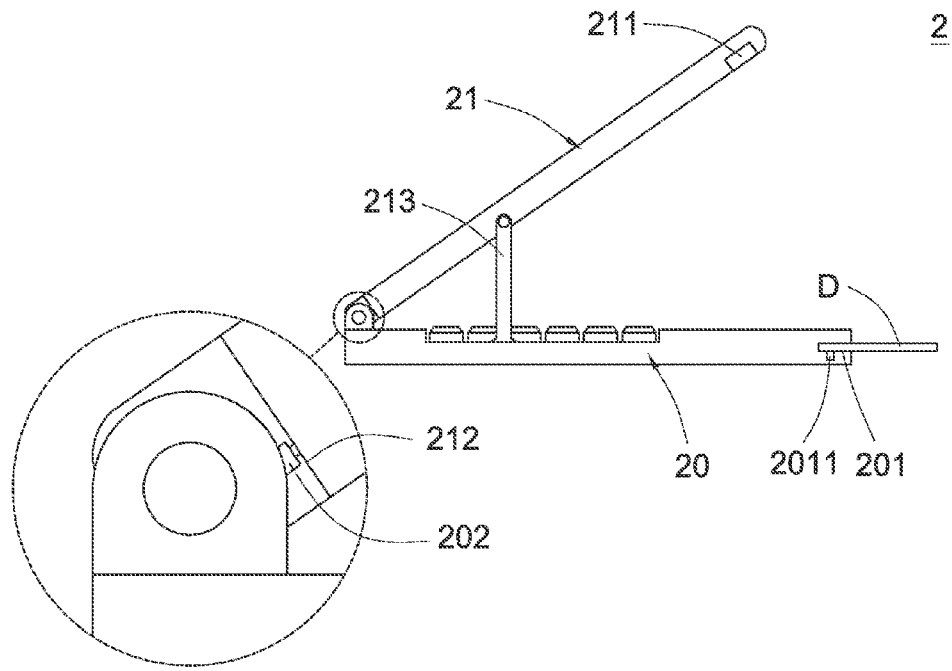
FIG. 3 is a schematic side view illustrating an image pickup system according to a second embodiment of the present invention.

FIG. 3 is a schematic side view illustrating an image pickup system according to a second embodiment of the present invention. As shown in FIG. 3, the image pickup system 2 comprises a base 20, a frame 21, a controlling unit (not shown) and an image recognition program (not shown). The base 20 comprises a receiving structure 201 and a switching element 202. The receiving structure 201 is formed in the base 20 for placing a target object D therein. The frame 21 is connected to the base 20. The frame 21 is rotatable with respect to the base 20. The frame 21 comprises an image pickup device 211, a triggering part 212 and a marking element 213. The image pickup device 211 is disposed on the frame 21 for shooting the target object D. As the frame 21 is rotated, the image pickup device 211 could approach the receiving structure 201. The image recognition program 23 is in communication with the image pickup device 211. The image recognition program 23 can analyze a preview image that is acquired by the image pickup device 211.

Most components included in the image pickup system of the second embodiment are identical to those of the first embodiment. For example, the image pickup system 2 is a notebook computer, the base 20 is a keyboard base, and the frame 21 is an upper cover. The image pickup device 211 is a web camera that is disposed on the upper cover 21. The receiving structure 201 is a recess of the keyboard base 20. On the other hands, some components included in the image pickup system of the second embodiment are different from those of the first embodiment. For example, the switching element 202 is disposed on the keyboard base 20, the triggering part 212 is disposed on the upper cover 21, and the marking element 213 is arranged on a sidewall of the upper cover 21. In this embodiment, the marking element 213 is a supporting rod. Moreover, the receiving structure 201 further comprises a detecting element 2011. The detecting element 2011 is connected to the controlling unit for detecting whether the target object D placed in the receiving structure 201 is detached from the receiving structure 201. Once the target object D is detached from the receiving structure 201, the detecting element 2011 issues a changing signal to the controlling unit. An example of the detecting element 2011 is a sensor.

Hereinafter, the operations of the image pickup system 2 will be illustrated in more details. For performing a shooting operation on the target object D by the image pickup system 2, the image pickup device 211 is moved toward the target object D by rotating the upper cover 21. As the upper cover 21 is rotated to a position where the switching element 202 is triggered by the triggering part 212, the switching element 202 generates a shooting signal to the controlling unit. After the shooting signal has been received for a delaying time, the controlling unit controls the image pickup device 211 to shot the target object D. As known, at the transient moment when the upper cover 21 is switched from a rotating status to a static status, the upper cover 21 is usually suffered from slight vibration. If the shooting operation is performed immediately after the shooting signal is received, the vibration of the upper cover 21 causes rocking of the image pickup device 211. Whereas, after the delaying time, the upper cover 21 is no longer suffered from vibration and thus the upper cover 21 is completely static. Under this circumstance, the rocking of the image pickup device 211 resulted from vibration of the upper cover 21 will be eliminated. On the other hand, when the switching element 202 is triggered by the triggering part 212, the marking element 213 (i.e. the supporting rod) is sustained against the keyboard base 20. As such, the upper cover 21 fails to be further rotated toward the base 20, and the image pickup device 211 is located at the optimal shooting position for performing the shooting operation.

After the shooting operation on the target object D is completed, the target object D may be removed from the recess 201 of the keyboard base 20 in order to shoot a next target object. When the detecting element 2011 detects that the target object D is detached from the recess 201, the detecting element 2011 issues a changing signal to the controlling unit. According to the changing signal, the controlling unit generates a warning signal to notify the user that the document placed in the recess 201 has been changed. The warning signal may also prompt the user to check whether the next target object placed in the recess 201 has been shot. Moreover, the detecting element 2011 and the image recognition program may cooperate with each other. After the next target object is placed in the recess 201, the image recognition program will analyze the preview image acquired by the image pickup device 211. By comparing the preview image with the stored target object image, the image recognition program can judge whether the preview image is identical to the target object image, and determine whether the image of the next target object needs to be shot. The operating principles of recognizing the target object by the image recognition program are similar to those illustrated in the first embodiment, and are not redundantly described herein.

Figure 4:
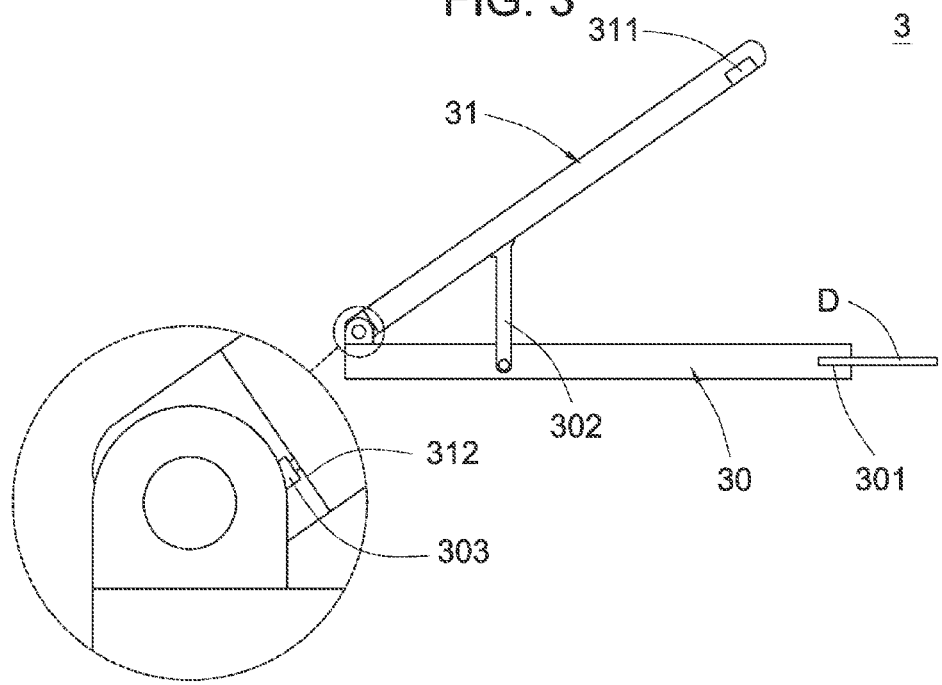
FIG. 4 is a schematic side view illustrating an image pickup system according to a third embodiment of the present invention.

FIG. 4 is a schematic side view illustrating an image pickup system according to a third embodiment of the present invention. In this embodiment, the image pickup system is not a notebook computer. As shown in FIG. 4, the image pickup system 3 comprises a base 30, a frame 31, a controlling unit (not shown) and an image recognition program (not shown). The base 30 comprises a receiving structure 301, a marking element 302 and a switching element 303. The receiving structure 301 is formed in the base 30 for placing a target object D therein. The frame 31 is connected to the base 30. The frame 31 is rotatable with respect to the base 30. The frame 31 comprises an image pickup device 311 and a triggering part 312. The image pickup device 311 is disposed on the frame 31 for shooting the target object D. As the frame 31 is rotated, the image pickup device 311 could approach the receiving structure 301. The operating principles of the controlling unit and the image recognition program are similar to those illustrated in the first and second embodiments, and are not redundantly described herein.

In this embodiment, the image pickup device 311 is a web camera. The receiving structure 301 is a recess. The image pickup system 3 is a foldable shooting stand. The triggering part 312 is disposed on the frame 31. The switching element 303 is disposed on the base 30. As the frame 31 is rotated, the switching element 303 may be triggered by the triggering part 312 to generate a shooting signal to the controlling unit. In contrast to the second embodiment, the marking element 302 is arranged on a sidewall of the base 30. The marking element 302 is a supporting rod.

For performing a shooting operation on the target object D by the image pickup system 3, the image pickup device 311 is moved toward the target object D by rotating the frame 31. As the frame 31 is rotated to a position where the switching element 303 is triggered by the triggering part 312, the switching element 303 generates a shooting signal to the controlling unit. After the shooting signal has been received for a delaying time, the controlling unit controls the image pickup device 311 to shoot the target object D. On the other hand, when the switching element 303 is triggered by the triggering part 312, the marking element 302 (i.e. the supporting rod) that is disposed on the base 30 will be sustained against the frame 31. As such, the upper cover 21 fails to be further rotated toward the base 30, and the image pickup device 311 is located at the optimal shooting position for performing the shooting operation.

From the above description, the image pickup system of the present invention is capable of precisely positioning the image pickup device by means of the marking element, and controlling the image pickup device to perform the shooting operation when the image pickup device is at the optimal shooting position. Moreover, the image recognition program of the image pickup system can judge whether the image of the to-be-shot document has been shot. As a consequence, the capacity of the storage memory of the image pickup system is saved, and the time required to re-shoot the image of the document is minimized. In comparison with the prior art, the image pickup system of the present invention is able to position the image pickup device more precisely and has enhanced imaging quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image pickup system, comprising:
   a base;
   a frame connected to said base, and rotatable with respect to said base;
   an image pickup device disposed on said frame for shooting a target object, thereby acquiring a target object image;
   a receiving structure disposed in said base for placing said target object therein;
   a switching element arranged between said frame and said base, wherein when said switching element is triggered, a shooting signal is generated and the distance between said image pickup device and said target object is equal to a shooting distance;
   a marking element for indicating that said switching element is triggered and the distance between said image pickup device and said target object is equal to said shooting distance; and
   a controlling unit connected to said image pickup device, wherein an image recognition program is executed in said image pickup system to analyze a preview image acquired by said image pickup device, and judge whether said preview image is identical to said target object image, wherein once said image recognition program judges that said preview image is identical to said target object image, said controlling unit issues a stopping signal to said image pickup device, and in response to said stopping signal, said image pickup device stops shooting said target object.

2. The image pickup system according to claim 1 wherein when said shooting signal is received by said controlling unit, said image pickup device is controlled by said controlling unit to shoot said target object.

3. The image pickup system according to claim 1 wherein after said shooting signal has been received by said controlling unit for a delaying time, said image pickup device is controlled by said controlling unit to shoot said target object.

4. The image pickup system according to claim 1 wherein said image pickup device is a web camera, and said receiving structure is a recess.

5. The image pickup system according to claim 1 wherein said image pickup system is a notebook computer, said frame is an upper cover, said base is a keyboard base, said image pickup device is a web camera disposed on the upper cover, and said receiving structure is a recess of said keyboard base.

6. The image pickup system according to claim 1 wherein said receiving structure further comprises a detecting element, which is connected to said controlling unit for detecting whether said target object placed in said receiving structure is detached from said receiving structure, wherein once said target object is detached from said receiving structure, said detecting element issues a changing signal to said controlling unit.

7. The image pickup system according to claim 6 wherein said detecting element is a sensor.

8. The image pickup system according to claim 1 wherein said image recognition program analyzes a preview block image of said preview image and a target object block image of said target object image, thereby judging whether said preview image is identical to said target object image, wherein a location of said preview block image included in said preview image corresponds to a location of said target object block image included in said target object image.

9. The image pickup system according to claim 1 wherein said image recognition program is an optical character recognition (OCR) program.

10. The image pickup system according to claim 1 wherein said target object is a document or a business card.

11. The image pickup system according to claim 1 wherein said switching element is disposed on said frame, and a triggering part is disposed on said base for triggering said switching element when said frame is rotated with respect to said base.

12. The image pickup system according to claim 1 wherein said switching element is disposed on said base, and a triggering part is disposed on said frame for triggering said switching element when said frame is rotated with respect to said base.

13. The image pickup system according to claim 1 wherein said marking element is arranged on a sidewall of said frame, wherein when said frame is rotated with respect to said base and said switching element is triggered, said marking element is sustained against said base such that said frame fails to be further rotated.

14. The image pickup system according to claim 13 wherein said marking element is a supporting rod.

15. The image pickup system according to claim 1 wherein said marking element is a first mark arranged at a sidewall of said frame, and a second mark is arranged on a sidewall of said base, wherein when said frame is rotated with respect to said base and the line going through said first mark and said second mark is a plumb line, the rotation of said frame is stopped and said image pickup device is allowed to shoot said target object.

16. The image pickup system according to claim 1 wherein said marking element is arranged on a sidewall of said base, wherein when said frame is rotated with respect to said base and said switching element is triggered, said marking element is sustained against said frame such that said frame fails to be further rotated.

17. The image pickup system according to claim 16 wherein said marking element is a supporting rod.

* * * * *